(12) United States Patent
Trinkner et al.

(10) Patent No.: US 11,999,596 B2
(45) Date of Patent: Jun. 4, 2024

(54) METHODS AND APPARATUS TO POWER A CRANE ON A WORK TRUCK USING AN ENGINE-POWERED SERVICE PACK

(71) Applicant: Illinois Tool Works Inc., Glenview, IL (US)

(72) Inventors: Michael Trinkner, Kaukauna, WI (US); Jeffery R. Ihde, Greenville, WI (US); Joseph C. Schneider, Menasha, WI (US); Nathan J. Jochman, Menasha, WI (US); Jeff Lenzner, Greenville, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 17/480,918

(22) Filed: Sep. 21, 2021

(65) Prior Publication Data

US 2022/0017029 A1   Jan. 20, 2022

Related U.S. Application Data

(63) Continuation of application No. 15/687,985, filed on Aug. 28, 2017, now Pat. No. 11,124,137.

(Continued)

(51) Int. Cl.
  *B66C 13/18* (2006.01)
  *B23K 9/10* (2006.01)
  (Continued)

(52) U.S. Cl.
  CPC ............ *B66C 13/18* (2013.01); *B23K 9/1006* (2013.01); *B23K 37/0294* (2013.01);
  (Continued)

(58) Field of Classification Search
  CPC .......... B23K 9/00; B23K 37/00; B60R 16/00; B60R 13/00; B66C 13/00; B66C 23/00; H02M 7/00; H02J 7/00
  See application file for complete search history.

(56) References Cited

U.S. PATENT DOCUMENTS 6,213,319 B1   4/2001   Khachaturian
6,818,860 B1   11/2004  Stava
(Continued)

FOREIGN PATENT DOCUMENTS

CN   2818432   9/2006
CN   101691190   4/2010
(Continued)

OTHER PUBLICATIONS

"Enpak" of "Maintainer", Feb. 1, 2009, please see URL: https:web.archive.org/web/20131128154427if_/http://www.maintainer.com:80/files/9813/8245/5915/EnPak_brochure_2-09.pdf (X & Y type reference).

(Continued)

*Primary Examiner* — Hal Kaplan
*Assistant Examiner* — Joseph N Inge
(74) *Attorney, Agent, or Firm* — McAndrews, Held & Malloy, Ltd.

(57) ABSTRACT

Methods and apparatus to power a crane on a work truck using an engine-powered service pack are disclosed. An example auxiliary power system for a vehicle includes an engine, a generator configured to convert mechanical energy from the engine to electrical energy, and power conversion circuitry configured to provide electrical power to a crane to enable the crane to lift at least a portion of a rated load, and configured to convert the electrical energy from the generator to output DC power.

20 Claims, 11 Drawing Sheets

Related U.S. Application Data

(60) Provisional application No. 62/381,537, filed on Aug. 30, 2016.

(51) Int. Cl.
| | |
|---|---|
| *B23K 37/02* | (2006.01) |
| *B60R 16/03* | (2006.01) |
| *B66C 13/22* | (2006.01) |
| *B66C 23/00* | (2006.01) |
| *B66C 23/38* | (2006.01) |
| *B66C 23/44* | (2006.01) |
| *F02B 63/04* | (2006.01) |
| *H02J 7/00* | (2006.01) |
| *H02M 7/04* | (2006.01) |

(52) U.S. Cl.
CPC .............. *B60R 16/03* (2013.01); *B66C 13/22* (2013.01); *B66C 23/38* (2013.01); *B66C 23/44* (2013.01); *B66C 23/54* (2013.01); *F02B 63/04* (2013.01); *H02J 7/00* (2013.01); *H02M 7/04* (2013.01)

(56) References Cited

U.S. PATENT DOCUMENTS

| | | | |
|---|---|---|---|
| 7,870,915 B2 | 1/2011 | Beeson | |
| 2008/0122195 A1* | 5/2008 | Beeson | B60K 25/00 |
| | | | 290/51 |
| 2009/0193800 A1* | 8/2009 | Peters | E02F 9/2242 |
| | | | 417/364 |
| 2011/0173963 A1 | 7/2011 | Renner | |
| 2011/0298624 A1* | 12/2011 | Bauman | H02J 7/14 |
| | | | 320/109 |
| 2013/0020300 A1* | 1/2013 | Albrecht | B23K 9/1006 |
| | | | 219/130.1 |
| 2014/0028029 A1* | 1/2014 | Jochman | H02M 1/42 |
| | | | 363/67 |

FOREIGN PATENT DOCUMENTS

| | | |
|---|---|---|
| CN | 101730631 | 6/2010 |
| CN | 201952132 | 8/2011 |
| CN | 104703742 | 6/2015 |

OTHER PUBLICATIONS

Int'l Search Report and Written Opinion Appln No. PCT/US2017/049061 dated Dec. 1, 2017 (17 pages).

Maintainer: "EnPak", Feb. 1, 2009 (Feb. 1, 2009), XP055426948, Retrieved from the Internet: URL:https://web.archive.org/web/20131128154427if/http://www.maintainer.com:80/files/9813/8245/5915/EnPak brochure_2-09.pdf [retrieved on Nov. 20, 2017.

\* cited by examiner

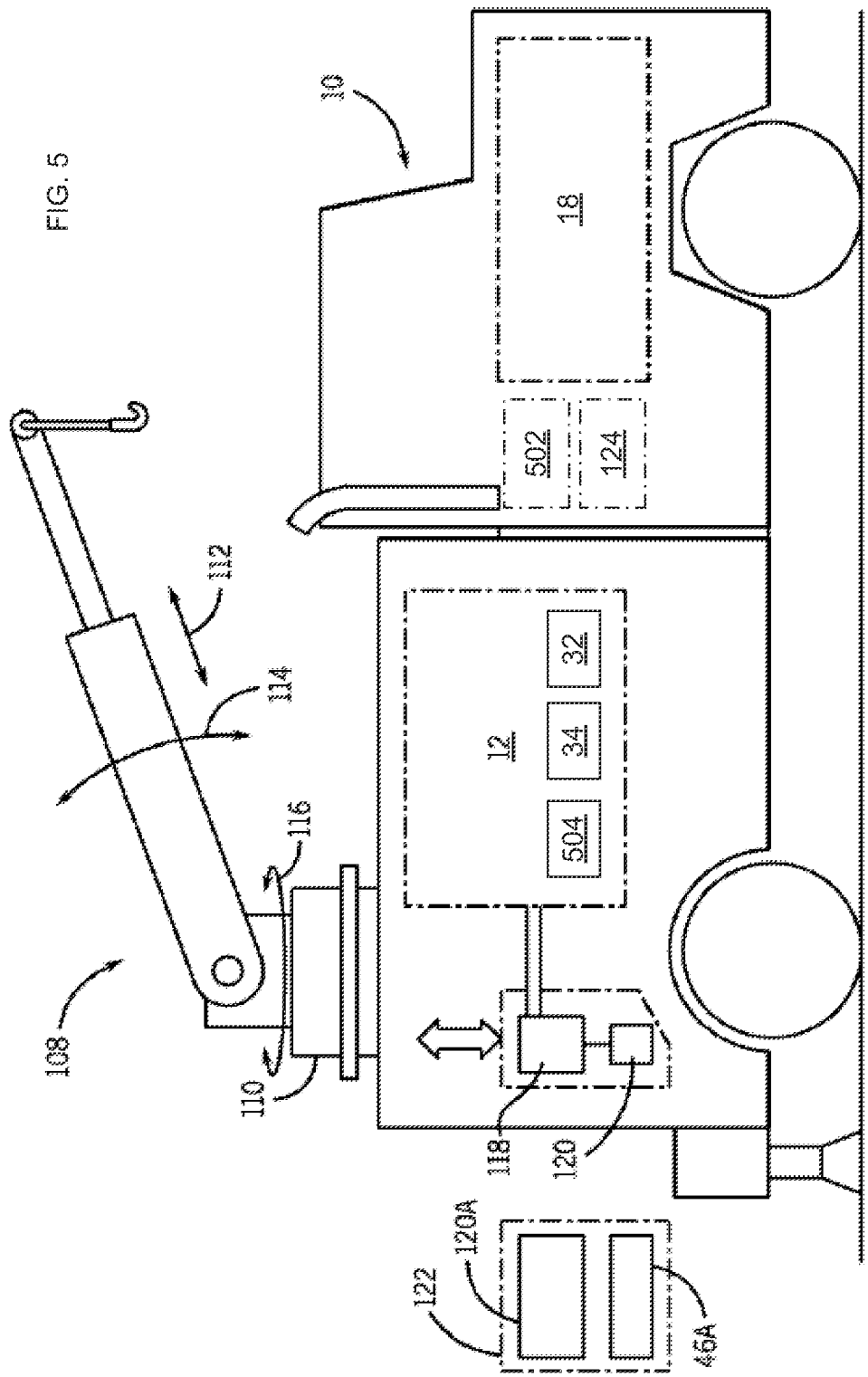

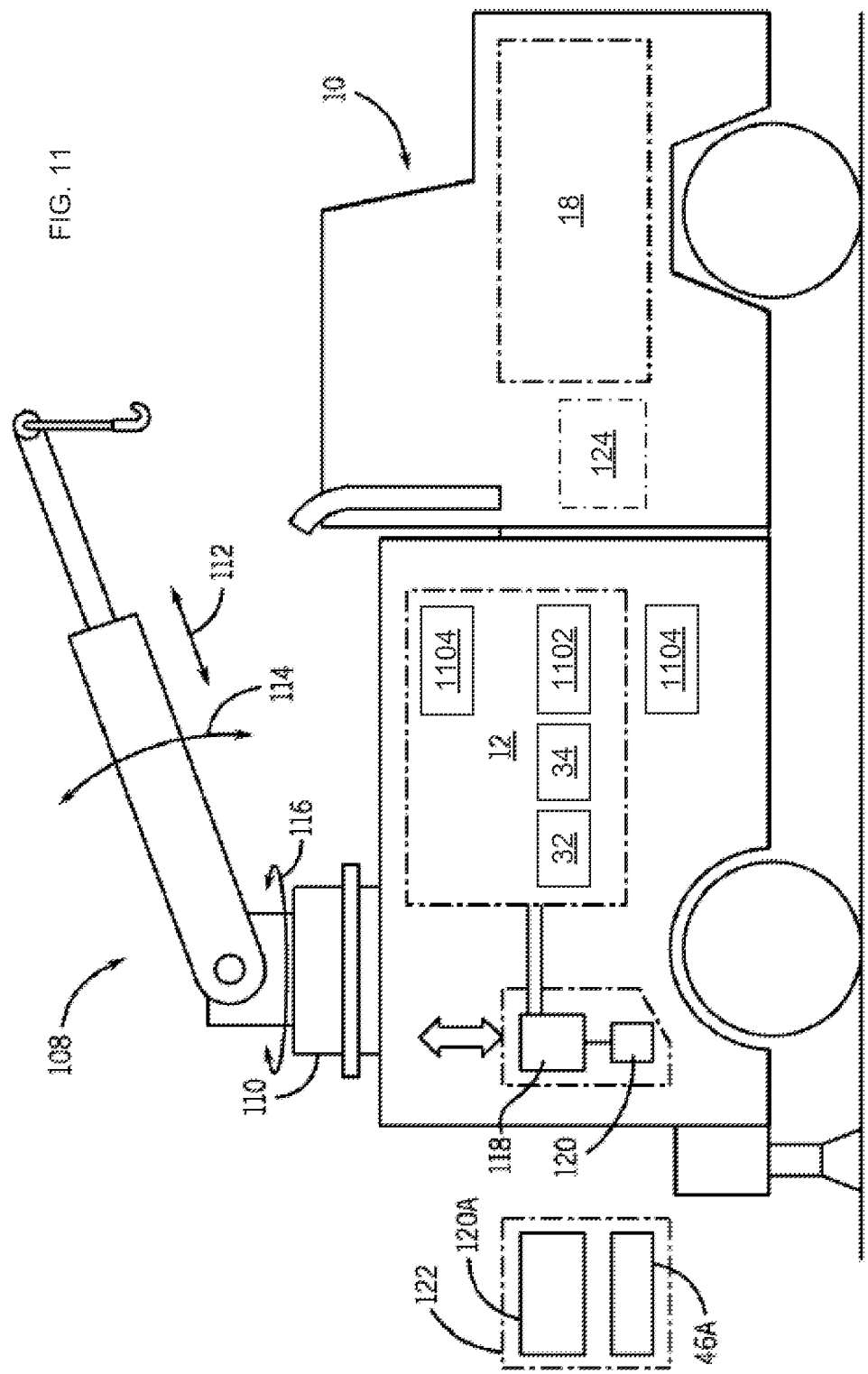

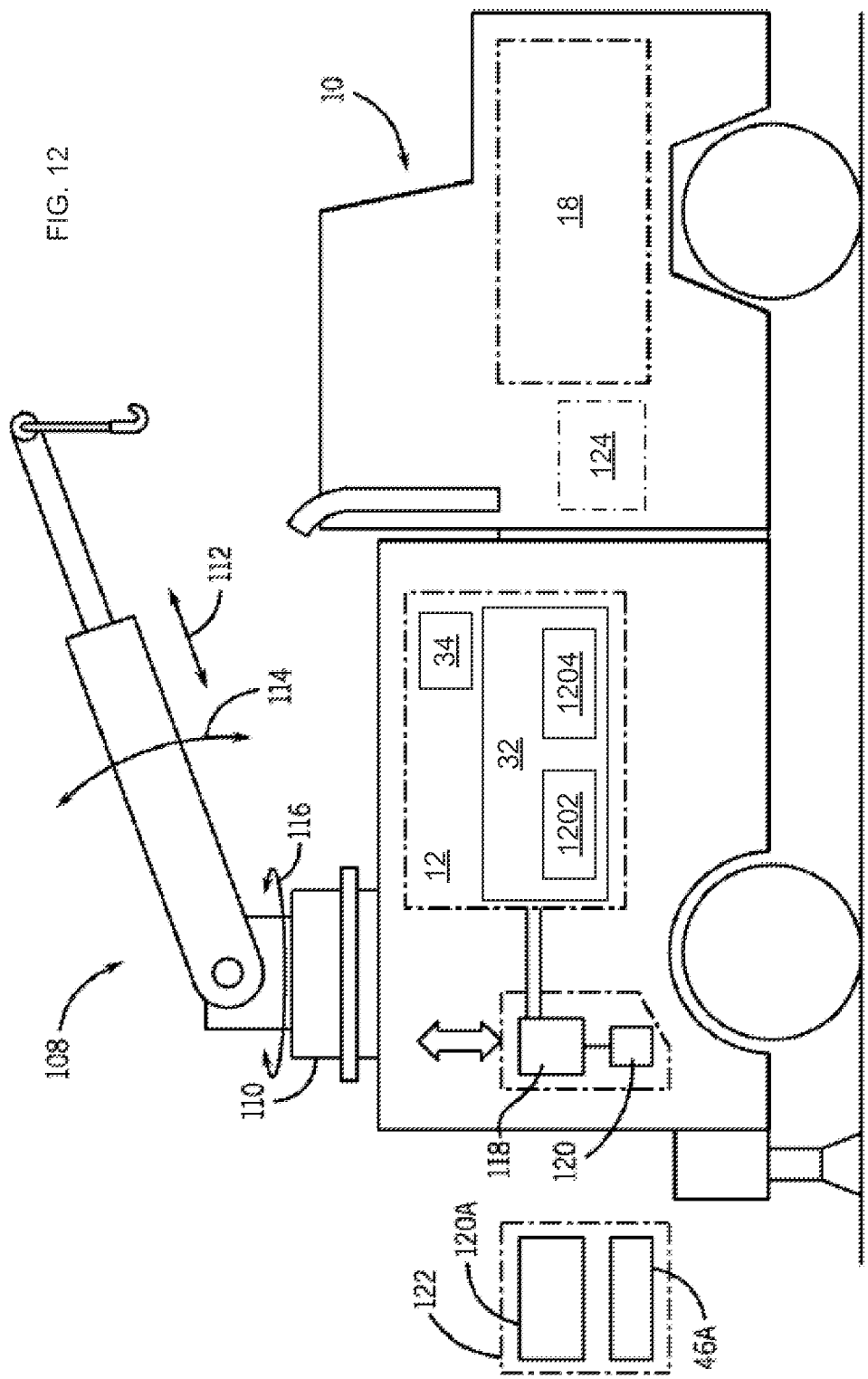

METHODS AND APPARATUS TO POWER A CRANE ON A WORK TRUCK USING AN ENGINE-POWERED SERVICE PACK

RELATED APPLICATIONS

This application is a continuation of U.S. Nonprovisional patent application Ser. No. 15/687,985, filed Aug. 28, 2017, which claims priority to U.S. Provisional Patent Application No. 62/381,537, filed Aug. 30, 2016, entitled "METHODS AND APPARATUS TO POWER A CRANE ON A WORK TRUCK USING AN ENGINE-POWERED SERVICE PACK," the entirety of both of which are incorporated herein by reference.

BACKGROUND

This disclosure relates generally to work vehicles, and more particularly to methods and apparatus to power a crane on a work truck using an engine-powered service pack. Disclosed examples relate to a flexible arrangement for providing one or more of electrical power, such as for welding, compressed air and hydraulic service in a stand-alone or integrated service pack in a work vehicle.

A wide range work vehicles have been developed and are presently in service. Present estimates are that hundreds of thousands of such vehicles are operative in the United States alone. Depending upon their intended use, work vehicles may include highly integrated systems for performing operations such as welding, cutting, assembly, and so forth. Moreover, vehicles have been developed for providing hydraulic and compressed air service to applications, such as for driving air tools, pneumatic lifts and other compressed air-driven devices, as well as hydraulic lifts, hydraulic tools, concrete and metal working tools, and so forth. Similarly, where electrical power is generated on a vehicle, this may be made available for powering electrical tools, lights, and a wide range of auxiliary devices.

Approaches to the design and operation of such work vehicles that incorporate auxiliary resources tend to take two separate paths. First, the auxiliary devices may be add-on systems that can simply be retrofitted to the vehicle. This is often the case for welding supplies and generators that are supplied in a stand-alone portable or semi-portable unit that can be mounted on or retrofitted to a vehicle, typically a truck. Attempts have been made to design such units for driving air compressors and hydraulic pumps as well, to provide pneumatic and hydraulic service.

In a second, quite different approach, the systems can be designed as original equipment in the vehicle, and driven directly by the vehicle engine or indirectly, such as by a belt, clutch or hydraulic motor receiving fluid from a pump that is driven by the vehicle engine. This is common in many applications where the auxiliary systems are provided as original equipment, either standard with the vehicle or as an option. In some of these arrangements, generators, pumps, air compressors, and so forth may be driven from a power take-off shaft which is, itself, driven by the main vehicle engine. A clutch or other selective engagement mechanism may be provided to enable the service systems to be driven when desired, and disengaged from the engine when the vehicle is transported to a work site.

While both of these approaches are effective and have their place in the market, they are not without drawbacks. For example, the stand-alone units occupy useful volume in the vehicles, typically in the bed of a truck. Moreover, they are subject to space and power constraints owing, in part, to the desire to maintain their volume relative small, and allow them to be kept portable. Such arrangements may be of limited accessibility to the user, such as for maintenance and servicing of the various components. Fully integrated systems driven by a vehicle engine, on the other hand, require that the vehicle engine be powered during periods of use of any one of the auxiliary systems. The vehicle engine is often grossly overrated as compared to the power needs of the auxiliary systems, and such operation reduces the overall life of the engine and drive train for vehicle transport needs. In many applications, the engine is left idling for extended periods between actual use of auxiliary systems, simply to maintain the option of using the systems without troubling the operator to start and stop the engine.

There is a need, therefore, for new approaches to the provision of auxiliary service, particularly electrical power, compressed air service and hydraulic service in work vehicles. There is a particular need for systems which avoid drawbacks of portable, retrofitted power supplies and service packs, while also avoiding the need to drive a main vehicle engine any time that auxiliary service is required.

BRIEF DESCRIPTION OF THE DRAWINGS

FIG. 5 is a diagrammatical representation of a service vehicle equipped with a crane that is powered by a service pack at least partially integrated with the vehicle engine support systems, in accordance with aspects of this disclosure.

FIG. 11 illustrates another example configuration of the work truck, the service pack, and the crane to use a battery charge circuit of the service pack connected to the electrical system of the service truck (e.g., hard wired, plugged in) to power the crane.

FIG. 12 illustrates another example configuration of the work truck, the service pack, and the crane to use an alternator of the service pack engine to power the crane.

The figures are not necessarily to scale. Where appropriate, similar or identical reference numbers are used to refer to similar or identical components.

DETAILED DESCRIPTION

Figure 1:
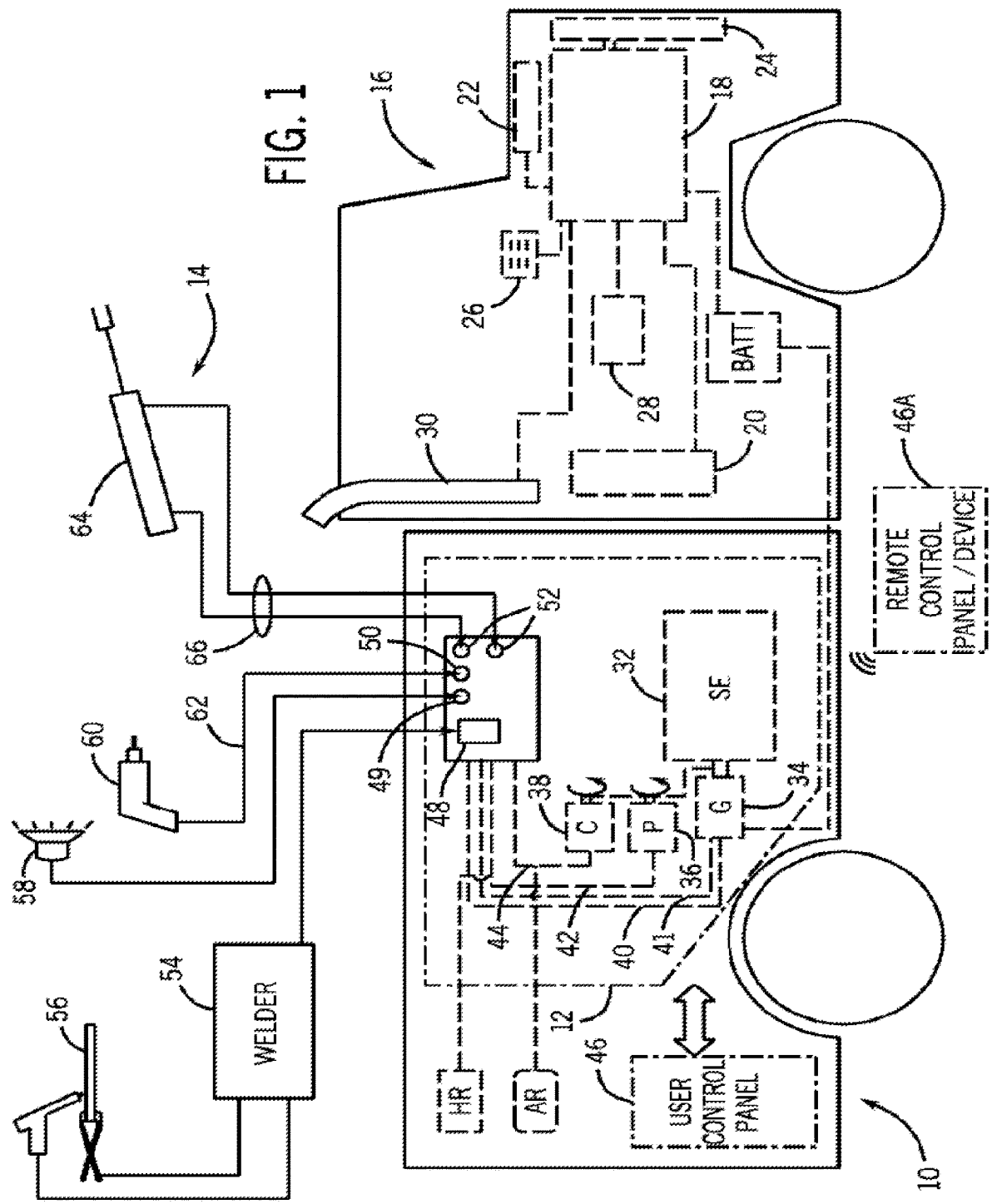
FIG. 1 is a diagrammatical overview of a work vehicle in which a service pack is installed, in accordance with aspects of the present disclosure.

Disclosed example vehicles and service packs for vehicles enable the use of electrically-powered cranes without operation of the engine of the vehicle on which the crane and/or service pack is installed. In some examples, a lower rated load may be lifted with a crane using power delivered using a power source such as a service pack without the vehicle engine. In some such examples, a higher rated load may be lifted with the crane using power delivered by the vehicle engine and the service pack. Examples of cranes that may be powered at least in part using a service pack include electric cranes and/or electric-hydraulic cranes.

Relative to conventional techniques for providing power to electrically-powered cranes (electric cranes and/or electric-hydraulic cranes), disclosed examples require less or no power to be provided by the work truck engine (or associated components such as the alternator or cranking battery) to power the crane. Instead, disclosed examples enable the work truck engine to be turned off while still enabling use of the crane via the service pack and/or one or more energy storage devices. While the work truck engine may be used to increase the available load capacity, the work truck may be provided with an alternator that has a reduced capacity relative to conventional techniques in which the work truck alternator is required to power the crane.

Disclosed example auxiliary power systems for vehicles include an engine, a generator configured to convert mechanical energy from the engine to electrical energy, and power conversion circuitry configured to provide electrical power to a crane to enable the crane to lift at least a portion of a rated load, and configured to convert the electrical energy from the generator to output DC power. In some examples, the power conversion circuitry includes at least one of a welding output or a battery charging output. In some such examples, the power conversion circuitry charges an energy storage device via the battery charging output. In some examples, the energy storage device is at least one of a cranking battery installed in the vehicle or an auxiliary battery coupled to the crane.

In some example auxiliary power systems, the power conversion circuitry includes an AC-to-DC converter configured to convert AC power from the generator to the DC power. In some such examples, the AC-to-DX converter includes a switched mode power supply and/or welding-type power conversion circuitry. In some examples, the power conversion circuitry is a welding-type power supply that is detachable from the generator.

Some example auxiliary power systems further include a remote control interface to control at least one aspect of the power conversion circuitry. In some such examples, the remote control interface controls operation of the crane receiving the electrical power from the power conversion circuitry. In some examples, the power conversion circuitry includes an alternating current (AC) receptacle, and the power conversion circuitry provides the electrical power to the crane via an electrical cord when the electrical cord is plugged into the AC receptacle.

In some example auxiliary power systems, the crane and the auxiliary power system are installed on the vehicle, and the power conversion circuitry provides the electrical power to operate the crane while an engine of the vehicle is off. In some examples, the power conversion circuitry includes a battery charging circuit coupled to a battery of the vehicle to charge the battery of the vehicle, where the battery charging circuit generates a battery charging output from the electrical energy from the generator and outputs the electrical power to the crane.

Some examples further include an alternator to receive the mechanical energy from the engine and to provide at least a first portion of the electrical power to the crane via the power conversion circuitry. In some such examples, second electrical power is provided to the crane from an energy storage device. Some example auxiliary power systems further include an energy storage device to output at least a first portion of the electrical power to the crane, in which the power conversion circuitry charges the energy storage device. In some examples, the crane is an electric crane or an electric-hydraulic crane.

Disclosed example auxiliary power systems for vehicles include an engine, a generator to convert mechanical power from the engine to alternating current (AC) electrical power, and to output the AC electrical power to a crane to enable the crane to lift at least a portion of a rated load, and power conversion circuitry to convert the AC electrical power to DC electrical power. In some examples, the power conversion circuitry includes at least one of a welding output or a battery charging output. In some examples, the generator is hardwired to the crane to provide the AC electrical power to the crane.

Disclosed example systems include a crane attached to a vehicle that has an engine. The example systems also include an auxiliary power unit having a service engine and a generator configured to generate alternating current power. The example systems further include a welding power supply configured to receive the alternating current power from the generator, selectively convert the alternating current power to welding power having a first voltage or to direct current power having a second voltage, and output the direct current power having the second voltage to power a hydraulic system of the electric-hydraulic crane.

Turning now to the drawings, and referring first to FIG. 1, a work vehicle 10 is illustrated. The work vehicle 10 is shown as a work truck, although any suitable configuration for the vehicle may be envisaged. In the illustrated embodiment, the vehicle includes a service pack, designated generally by reference numeral 12 for supplying electrical, compressed air and hydraulic power to a range of applications, designated generally by reference numeral 14. As used herein, the terms "service pack" and "auxiliary power unit" refer to an engine driven power source which may be auxiliary or supplemental to a primary power source such as a vehicle engine. The work vehicle 10 has a main vehicle power plant 16 based around a vehicle engine 18. Example work vehicle engines of this type may be diesel engines, gasoline engines, and/or mixed ethanol-gasoline engines.

The vehicle power plant 16 includes a number of conventional support systems. For example, the engine 18 will consume fuel from a fuel reservoir 20, typically one or more liquid fuel tanks. An air intake or air cleaning system 22 supplies air to engine 18, which may, in some applications, be turbo charged or super charged. A cooling system 24, which will typically include a radiator, circulation pump, a thermostat-controlled valve and a fan, provides for cooling the engine. An electrical system includes an alternator or generator, along with one or more system batteries, cabling for these systems, cable assemblies routing power to a fuse box or other distribution system, and so forth. A lube oil system 28 will typically be included for many engine types, such as for diesel engines. As will be appreciated by those skilled in the art, such lube oil systems typically draw oil from the diesel engine crankcase, and circulate the oil through a filter and cooler, if present, to maintain the oil in good working condition. Finally, the power plant 16 will be served by an exhaust system 30 which may include catalytic converters, mufflers, and associated conduits.

The service pack 12 may include one or more service systems driven by a service engine 32. In some examples, the service pack 12 provides electrical power, hydraulic power and compressed air for the applications 14. In the diagrammatical representation of FIG. 1, for example, the service engine drives a generator 34 as well as a hydraulic pump 36 and air compressor 38. The engine itself may be of any desired type, but in a present embodiment a diesel engine is contemplated. Certain embodiments may use gasoline or other engines. The generator 34 may be directly driven by the service engine 32, such as by close coupling the generator 34 to the service engine 32, or may be belt or chain driven, where desired. Presently contemplated generators include three-phase brushless types, capable of producing power for a range of applications. However, other generators may be employed, including single-phase generators and generators capable of producing multiple power outputs. The hydraulic pump 36 may be based on any conventional technology, such as piston pumps, gear pumps, vane pumps, with or without closed-loop control of pressure and/or flow. The air compressor 38 may also be of any suitable type, although a rotary screw air compressor is presently contemplated due to its superior output to-size ratio. Other suitable compressors might include reciprocating compressors typically based upon one or more reciprocating pistons.

The systems of the service pack 12 will include appropriate conduits, wiring, tubing and so forth for conveying the service generated by these components to an access point. Convenient access points will be located around the periphery of the vehicle. In a presently contemplated embodiment, all of the services may be routed to a common access point, although multiple access points can certainly be envisaged. The diagrammatical view of FIG. 1 illustrates the generator 34 as being coupled to electrical cabling 40 (for AC power supply) and 41 (for 12 volt DC power supply), whereas the hydraulic pump 36 is coupled to hydraulic circuit 42, air compressor 38 is coupled to an air circuit 44. As will be appreciated by those skilled in the art, the wiring and circuitry for all three systems will typically include protective circuits for the electrical power, including fuses, circuit breakers, and so forth, as well as valving for the hydraulic and air service. For the supply of electrical power, certain types of power may be conditioned (e.g., smoothed, filtered, etc.), and 12 volt power output may be provided by rectification, filtering and regulating of AC output. Valving for hydraulic power output may include by way example, pressure relief valves, check valves, shut-off valves, as well as directional control valving. Moreover, it should be understood that, although not represented specifically in FIG. 1, the hydraulic pump will draw fluid from and return fluid to a fluid reservoir, which will typically include an appropriate vent for the exchange of air during use with the interior volume of the reservoir, as well as a strainer or filter for the hydraulic fluid. Similarly, the air compressor 38 will typically draw air from the environment through an air filter (not shown).

In some examples, the generator 34 is also coupled to the vehicle electrical system, and particularly to the vehicle battery. Thus, as described below, not only may the service pack 12 allow for 12 VDC loads to be powered without operation of the main vehicle engine 18, but the vehicle battery may serve as a shared battery, and is maintained in a good state of charge by the service pack generator output.

The cabling and conduits 40, 41, 42 and 44 may, as in the illustrated embodiment, route service for all of these systems directly from connections on the service pack 12. In a presently contemplated embodiment, for example, connections are provided at or near a base of an enclosure of the service pack 12, such that connections can be easily made without the need to open the enclosure. Moreover, certain control functions may be available from a control and service panel 46. The service panel 46, as noted above, may be located on any surface of the vehicle, or on multiple locations in the vehicle, and may be covered by doors or other protective structures, where desired. There is no requirement, generally, that the service panel 46 be located at the same location, or even near the locations of access to the electrical, hydraulic or compressed air output points of the service pack. In a presently contemplated embodiment, the panel is provided in a rear compartment covered by an access door. The control and service panel 46 may permit, for example, starting and stopping of the service engine 32 by a keyed ignition or starter button. Other controls for the engine may also be provided on the control and service panel 46. The control and service panel 46 may also provide operator interfaces for monitoring the service engine 32, such as fuel level gages, pressure gages, as well as various lights and indicators for parameters such as pressure, speed, and so forth. The service panel may also include a stop, disconnect or disable switch (not separately shown) that allows the operator to prevent starting of the service engine 32, such as during transport.

As also illustrated in FIG. 1, a remote control panel or device 46A may also be provided that may communicate with the service panel 46 or directly with the service pack via cabling or wirelessly. In a manner similar to conventional crane or manlift controls, then, the operator may start and stop the service engine 32, and control certain functions of the service pack (e.g., engagement or disengagement of a clutched component, such as an air compressor) without directly accessing either the components within the service pack enclosure or the service panel 46.

As noted above, any desired location may be selected as a convenient access point for one or more of the systems of the service pack. In the illustrated embodiment, for example, one or more alternating current electrical outputs, which may take the form of electrical receptacles 48 (for AC power, such as 110 VAC and/or 220 VAC power) and 49 (for DC power, such as 12 VDC and/or 24 VDC power) are provided. The service panel 46 may enable a user to select output configurations for the receptacles 48, 49. Similarly, one or more pneumatic connections, typically in the form of a quick disconnect fitting may be provided as indicated at reference numeral 50. Similarly, hydraulic power and return connections 52 may be provided, which may also take the form of quick disconnect fittings.

In the embodiment illustrated in FIG. 1, the applications 14 may be coupled to the service pack 12 by interfacing with the outputs provided by receptacle 48. For example, a portable welder 54 may be coupled to the AC receptacle 48, and may provide constant current or constant voltage-regulated power suitable for a welding application. As will be appreciated by those skilled in the art, the welder 54 itself may receive power from the electrical output of the generator, and itself contain circuitry designed to provide for appropriate regulation of the output power provided to cables suitable for a welding application 56. Some examples include welders, plasma cutters, and so forth, which may operate in accordance with any one of many conventional welding techniques, such as stick welding, tungsten inert gas (TIG) welding, metal inert gas (MIG) welding, and so forth. Although not illustrated in FIG. 1, certain of these welding techniques may call for or conveniently use wire feeders to supply a continuously fed wire electrode, as well as shielding gasses and other shielding supplies. Such wire feeders may be coupled to the service pack 12 and powered by the service pack 12, where desired.

Similarly, DC loads may be coupled to the DC receptacle 49. Such loads may include lights 58, or any other loads that would otherwise be powered by operation of the main vehicle engine. It should also be noted that, as mentioned above, the 12 volt DC output of the service pack also serves to maintain the vehicle battery charge, and to power any ancillary loads that the operator may need during work (e.g., cab lights, hydraulic system controls, etc.).

The pneumatic and hydraulic applications may be similarly be coupled to the service pack as illustrated diagrammatically in FIG. 1. For example, a hose 62 or other conduit may be routed from the compressed air source at the outlet 50 to a tool, such as an impact wrench 60. Many such pneumatic loads may be envisaged. Similarly, a hydraulic load, illustrated in the form of a reciprocating hydraulic cylinder 64 may be coupled to the hydraulic circuit 42 by means of appropriate hoses or conduits 66. As noted above, and as will be appreciated by those skilled in the art, certain of these applications, particularly the hydraulic applications, may call for the use of additional valving, particularly for directional control and load holding. Such valving may be incorporated into the work vehicle or may be provided separately either in the application itself or intermediately between the service pack and the hydraulic actuators. It should also be noted that certain of the applications illustrated diagrammatically in FIG. 1 may be incorporated into the work vehicle itself. For example, the work vehicle may be designed to include a man lift, scissor lift, hydraulic tail gate, or any other driven systems which can be coupled to the service pack and driven separately from the main vehicle engine.

The service pack 12 may be physically positioned at any suitable location in the vehicle. In a presently contemplated embodiment, for example, the service engine 32 may be mounted on, beneath or beside the vehicle bed or work platform rear of the vehicle cab. In many such vehicles, for example, the vehicle chassis may provide convenient mechanical support for the engine and certain of the other components of the service pack. For example, steel tubing, rails or other support structures extending between front and rear axles of the vehicle may serve as a support for the service engine 32. It should be noted that, depending upon the system components selected and the placement of the service pack 12, reservoirs may be provided for storing hydraulic fluid and pressurized air (denoted HR and AR, respectively in FIG. 1). As will be appreciated by those skilled in the art, however, the hydraulic reservoir may be placed at various locations or even integrated into the service pack enclosure. Likewise, depending upon the air compressor selected, no reservoir may be required for compressed air.

In use, the service pack will provide power for the on-site applications completely separately from the vehicle engine. That is, the service engine 32 generally may not be powered during transit of the vehicle from one service location to another, or from a service garage or facility to a service site. Once located at the service site, the vehicle may be parked at a convenient location, and the main engine 18 may be shut down. The service engine 32 may then be powered, to provide service from one or more of the service systems described above. Where desired, clutches, or other mechanical engagement devices may be provided for engagement and disengagement of one or more of the generator, the hydraulic pump and the air compressor, depending upon these service are required. Moreover, as in conventional vehicles, where stabilization of the vehicle or any of the systems is require, the vehicle may include outriggers, stabilizers (not shown), and so forth which may be deployed after parking the vehicle and prior to operation of the service pack. One or more of the services provided by the work vehicle 10 may be performed without the need to operate the main vehicle engine at a service site.

Figure 2:
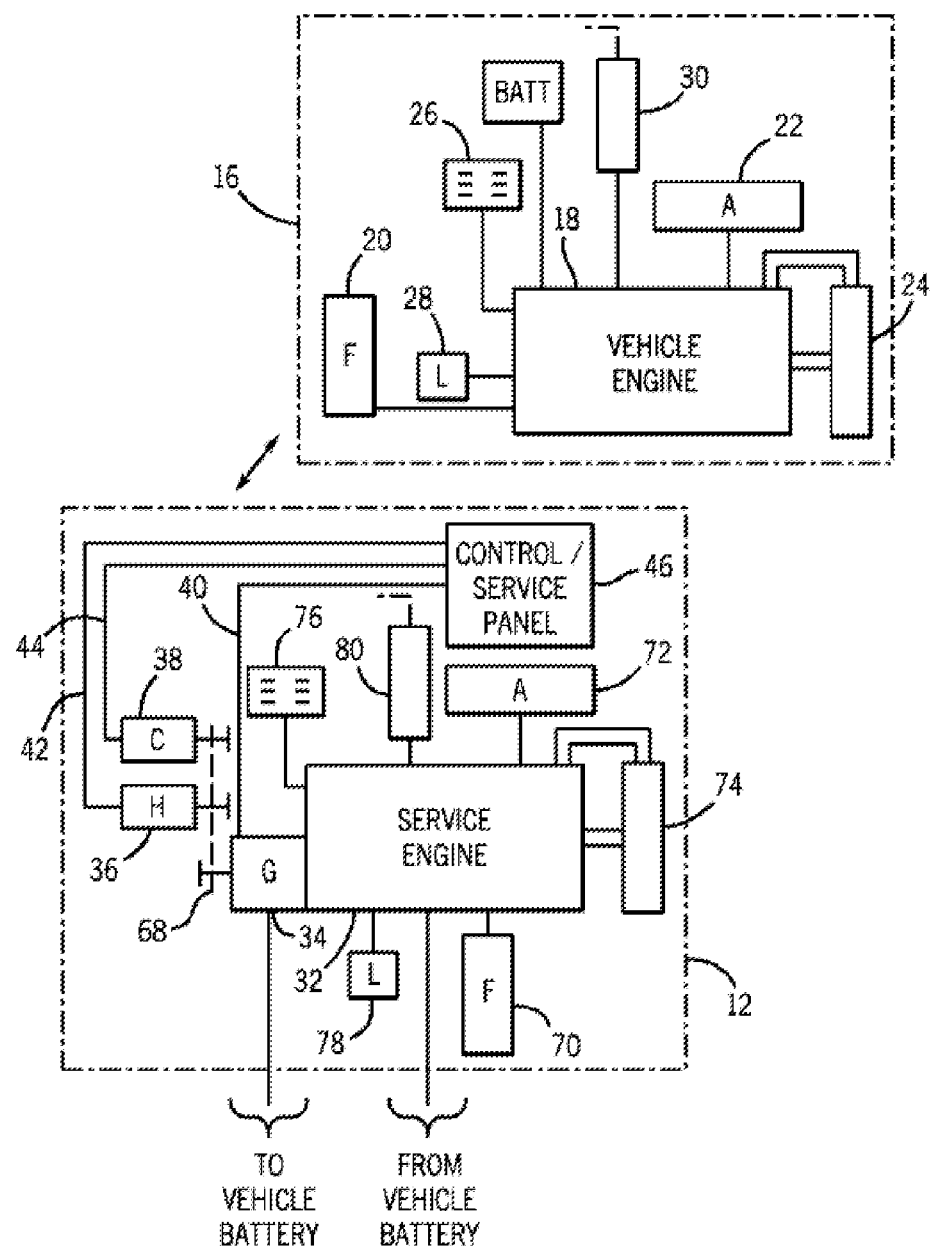
FIG. 2 is diagrammatical representation of power systems in the vehicle of FIG. 1 in accordance with one alternative embodiment, in which the service pack is completely separate and independent from support systems of the vehicle engine.

Several different scenarios may be envisaged for driving the components of the service pack 12, and for integrating or separating the support systems of the service pack from those of the vehicle power plant. One such approach is illustrated in FIG. 2, in which the service pack 12 is entirely independent and operates completely separately from the vehicle power plant. In the embodiment illustrated in FIG. 2, as shown diagrammatically, the support systems for the vehicle power plant 16 are coupled to the vehicle engine in the manner set forth above. The service pack 12 reproduces some or all of these support systems for operation of the service engine 32. In the illustrated embodiment, for example, these support systems include a separate fuel reservoir 70, a separate air cleaner system 72, a separate cooling system 74, a separate electrical protection and distribution system 76, a separate lube oil system 78, where required for the service engine 32, and a separate exhaust system 80.

Many or all of these support systems may be provided local to the service engine 32, that is, at the location where the service engine 32 is supported on the vehicle. As will be appreciated by those skilled in the art, on larger work vehicles, access to the location of the service engine and the service pack in general, may be facilitated by the relatively elevated clearance of the vehicle over the ground. Accordingly, components such as the fuel reservoir, air cleaner, cooling system radiator, electrical fuse box, and so forth may be conveniently positioned so that these components can be readily serviced. Also, in the illustrated embodiment, the hydraulic pump 36 and air compressor 38 are illustrated as being driven by a shaft extending from the generator 34, such as by one or belts or chains 68. As noted above, one or both of these components, or the generator itself may be provided with a clutch or other mechanical disconnect to allow them to idle while other systems of the service pack are operative.

Figure 3:
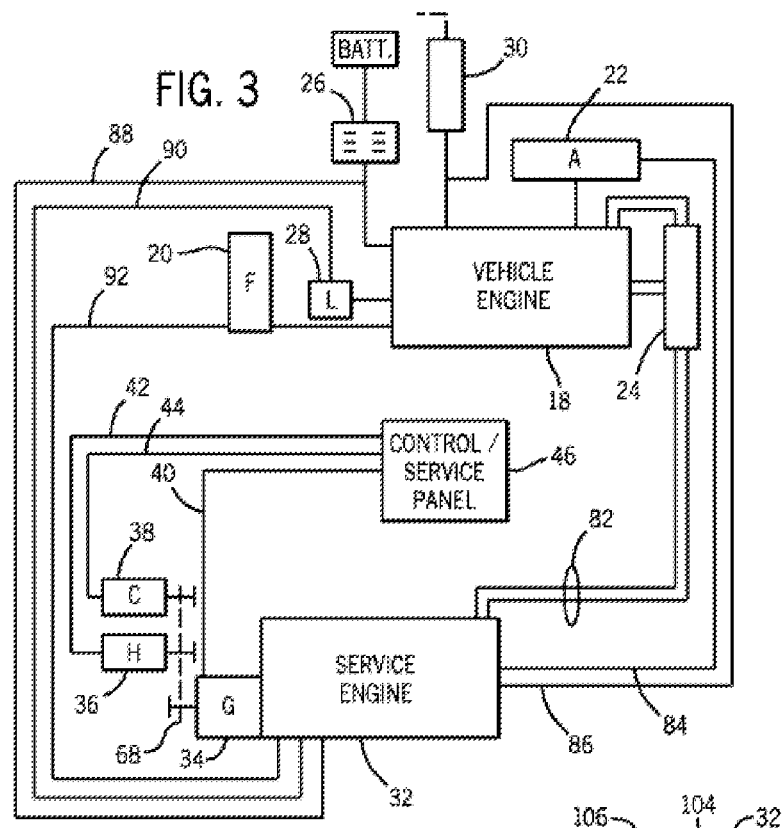
FIG. 3 is a diagrammatical representation of another alternative configuration in which support systems for the service pack are highly integrated with those of the vehicle power plant.

FIG. 3 represents an alternative configuration in which the service pack support systems are highly integrated with those of the main vehicle power plant. In the illustration of FIG. 3, for example, all of the systems described above may be at least partially integrated with those of the vehicle power plant. Thus, coolant lines 82 are routed to and from the vehicle cooling system 24, while an air supply conduit 84 is routed from the air intake or cleaner 22 of the vehicle engine. Similarly, an exhaust conduit 86 routes exhaust from the service engine 32 to the exhaust system 30 of the vehicle engine. The embodiment of FIG. 3 also illustrates integration of the electrical systems of the vehicle and the service pack 12, as indicated generally by the electrical cabling 88 which routes electrical power to the distribution system 26 of the vehicle. The systems may also integrate lube oil functions, such that lubricating oil may be extracted from both crank cases in common, to be cleaned and cooled, as indicated by conduit 90. Finally, a fuel conduit 92 may draw fuel from the main reservoir 20 of the vehicle, or from multiple reservoirs where such multiple reservoirs are present on the vehicle.

In presently contemplated embodiments, integrated systems of particular interest include electrical and fuel systems. For example, while the generator of the service pack may provide 110 volt AC power for certain applications, its ability to provide 12 volt DC output is particularly attractive to supplement the charge on the vehicle batteries, for charging other batteries, and so forth. It will be appreciated that the provision of both power types, however, makes the system even more versatile, enabling 110 volt AC loads to be powered (e.g., for tools, welders, etc.) as well as 12 volt DC loads (e.g., external battery chargers, portable or cab-mounted heaters or air conditioners, etc.).

It should be borne in mind that integration solutions between those of FIG. 2 and FIG. 3 are also contemplated. For example, some of the support systems may be best separated in the vehicle both for functional and mechanical or flow reasons. Alternative integration solutions to those shown in FIG. 2 and FIG. 3 may be implemented, as well as some degree of elimination of redundancy between these systems. In a presently contemplated embodiment, at least some of the support systems for the primary vehicle engine are used to support the service pack power plant. For example, at least the fuel supply and electrical systems can be at least partially integrated to reduce the redundancy of these systems. The electrical system may thus serve certain support when the vehicle engine is turned off, removing dependency from the electrical system, or charging the vehicle batteries. Similarly, heating, ventilating and air conditioning systems may be supported by the service engine 32, such as to provide heating of the vehicle cab when the primary engine is turned off. Thus, more or less integration and removal of redundancy is possible.

Figures 4A, 4B:
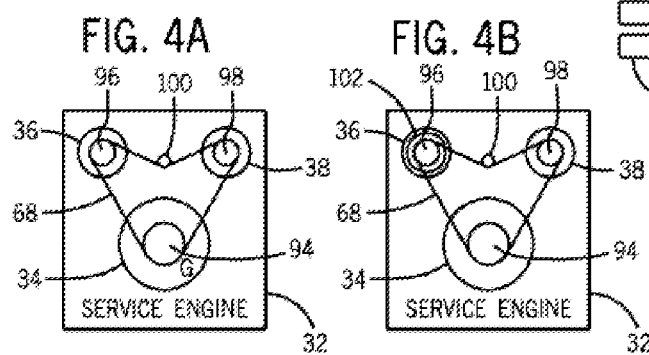
FIGS. 4A-4C are diagrammatical elevations of example physical arrangements of components of a service pack in which a generator, a hydraulic pump and an air compressor are driven by a service pack engine.
Figure 4C:
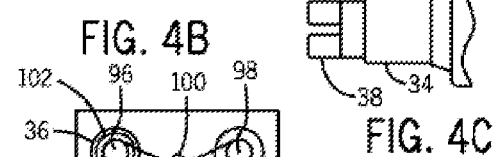

The foregoing service pack systems may also be integrated in any suitable manner for driving the service components, particularly the generator, hydraulic pump and air compressor, and particularly for powering the on-board electrical system. FIGS. 4A-4C illustrate simplified diagrams of certain manners for driving these components from the service engine 32. In the embodiment illustrated in FIG. 4A, the generator 34 may be close-coupled to the output of the service engine 32, such as directly to the engine fly wheel or to a shaft extending from the engine. This coupling may be disposed in a support housing used to support the generator on the engine block or other engine support structures. A sheave 94 is mounted to an output shaft extending from the generator (not shown in FIG. 4), and similar sheaves 96 and 98 are coupled to the hydraulic pump 36 and air compressor 38. One or more belts and/or clutches is drivingly coupled between these components, and an idler 100 may be provided for maintaining tension on the belt. Such an arrangement is shown in FIG. 4B, in which the hydraulic pump is driven through a clutch 102, such as an electric clutch. Although not shown specifically, any one of the components may be similarly clutched to allow for separate control of the components. Such control may be useful for controlling the power draw on the service engine 32, particularly when no load is drawn from the particular component, and when the component is not needed for support of the main vehicle engine systems (e.g., maintaining a charge on the vehicle batteries).

As will be appreciated by those skilled in the art, these components may be supported in any suitable manner, and may typically include some sort of rotating or adjustable mount such that the components may be swung into and out of tight engagement with the belt to maintain the proper torque-carrying tension on the belt and avoid slippage. More than one belt may be provided on appropriate multi-belt sheaves, where the torque required for turning the components is greater than that available from a single belt. Other arrangements, such as chain drives, may also be envisaged. Moreover, as described above, the generator 34 may also be belt or chain driven, or more than one component may be driven directly by the service engine 32, such as in an in-line configuration. In a further alternative arrangement, one or more of the components may be gear driven, with gearing providing any required increase or decrease in rotational speed from the output speed of the engine. An exemplary arrangement of this type is shown diagrammatically in FIG. 4C. In the illustrated arrangement, a support adapter 104 mounts the generator 34 on the service engine 32, and the hydraulic pump 36 and air compressor 38 are driven by a gear reducer. In such arrangements, one or more clutches may still be provided upstream or downstream of the gear reducer for selective control of the components.

It should also be noted that the particular component or components that are directly and/or indirectly driven by the engine may be selected based upon the component and engine specifications. For example, it may be desirable to directly drive the hydraulic pump, and to drive the generator via a belt or gear arrangement, permitting the engine to operate at a higher speed (e.g., 3000 RPM) while allowing a reduced speed to drive the generator (e.g., 1800 RPM for near 60 Hz AC output of a 4 pole generator).

As noted above, the service pack described in the present disclosure, integrated with one or more of the main vehicle engine support systems, may be designed to interface with any desired type of vehicle. Some such vehicles will include cranes, manlifts, and so forth. FIG. 5 illustrates an example service pack integrated with a service vehicle on which a crane 108 is mounted. Such cranes may be mounted within a bed or on a work platform of the vehicle, or as in the illustrated embodiment, on a side support structure. Moreover, such cranes may be mechanical, electrical or hydraulically powered. Disclosed service packs enable the crane to be operated without power from the main vehicle engine. That is, once the vehicle is positioned at the work site, the main vehicle engine may be stopped and the service pack engine started for crane operation.

In the embodiment illustrated in FIG. 5, the crane 108 is mounted on a rotating support structure 110, and hydraulically powered such that it may be extended, raised and lowered, and rotated (as indicated by arrows 112, 114 and 116, respectively) by pressurized hydraulic fluid provided by the service pack 12. The service pack 12, again, has one or more shared support systems with the main vehicle engine 18, in the illustrated embodiment, the service pack 12 is coupled to control valving (e.g., directional control valves) 118 that can be manually operated to control the crane. Controls, designated generally by reference numeral 120, may be provided with the valving in an enclosed compartment. In certain arrangements, the controls may include electrically operated valves that operate with power supplied by the service pack. In other arrangements, valving may be entirely manual.

As also illustrated in FIG. 5, where desired, a remote control pack 122 may be provided that may integrate controls for the service pack with those for the crane. In this example, a remote control interface 120A may communicate with controls 120 via a tethered connection, or wirelessly. In a manner similar to that described above with reference to FIG. 1, then, similar tethered or wireless controls may be provided for the service pack 12, as indicated by reference numeral 46A. Such arrangements permit the operator to control both the crane and operation of various components of the service pack 12, including the engine itself, via the integrated control pack.

In some examples, the crane 108 is an electric over hydraulic crane, and the service pack 12 provides electrical power to the crane 108 to enable operation of the crane 108. The electrical power enables one or more hydraulic pumps of the crane 108 to operate, and the ability of the crane 108 to lift loads is at least partially dependent on the amount of current that can be provided to the crane 108.

Conventional work truck cranes draw power from the battery of the work truck, and recommend or require certain minimum specifications in the electrical system of the work truck to operate the crane. For example, the crane may require a battery that is capable of 500 amps of cold cranking current and an alternator capable of providing at least 60 Amps (or 70 Amps, Amps, etc.). In some examples, an alternator 502 of the work vehicle 10 is capable of providing at least 100 Amps. In some such examples, the alternator 502 is capable of providing at least 180 Amps. Such conventional cranes are then connected to the battery (e.g., 12 VDC) of the work truck to draw power when the crane is in operation. As a result, operation of such cranes require the work truck engine to continue running to provide the electrical power to the crane and/or charge the battery.

In the example of FIG. 5, the crane 108 draws power from the electrical system of the engine 18 of the work vehicle 10, including one or more batteries 124 (e.g., the one or more batteries used to run the engine 18 of the work vehicle 10) and/or the alternator 502 of the work vehicle 10. The service pack 12 is configured to charge the one or more batteries 124 of the work vehicle 10 in conjunction with the alternator 502 of the work vehicle 10. As a result, the system illustrated in FIG. 5 increases the total current that can be provided to the crane 108 over the current that can be provided by the work vehicle 10 alone. The service pack 12 may increase the size of the crane 108 that can be supported by the electrical system of the work vehicle 10, decrease the requirements of the batteries 124 and/or the alternator 502 of the work vehicle 10 for a given crane capacity, and/or improve the performance (e.g., lifting speed, duty cycle) of the crane 108 for a given capacity of the batteries 124 and the alternator 502 of the work vehicle 10.

The example service pack 12 of FIG. 5 includes power conversion circuitry 504 to convert the electrical power from the generator 34 to DC power. The example power conversion circuitry 504 may be an AC-to-DC converter configured to convert AC power from the generator 34 to a DC power output. The DC power may be a welding-type electrical output (e.g., a switched mode power supply, or inverter-based welding-type power supply, a transformer-based welding-type power supply, etc.), a battery-charging output, and/or electrical power suitable to drive the crane 108 to the rated load of the crane 108.

Figure 6:
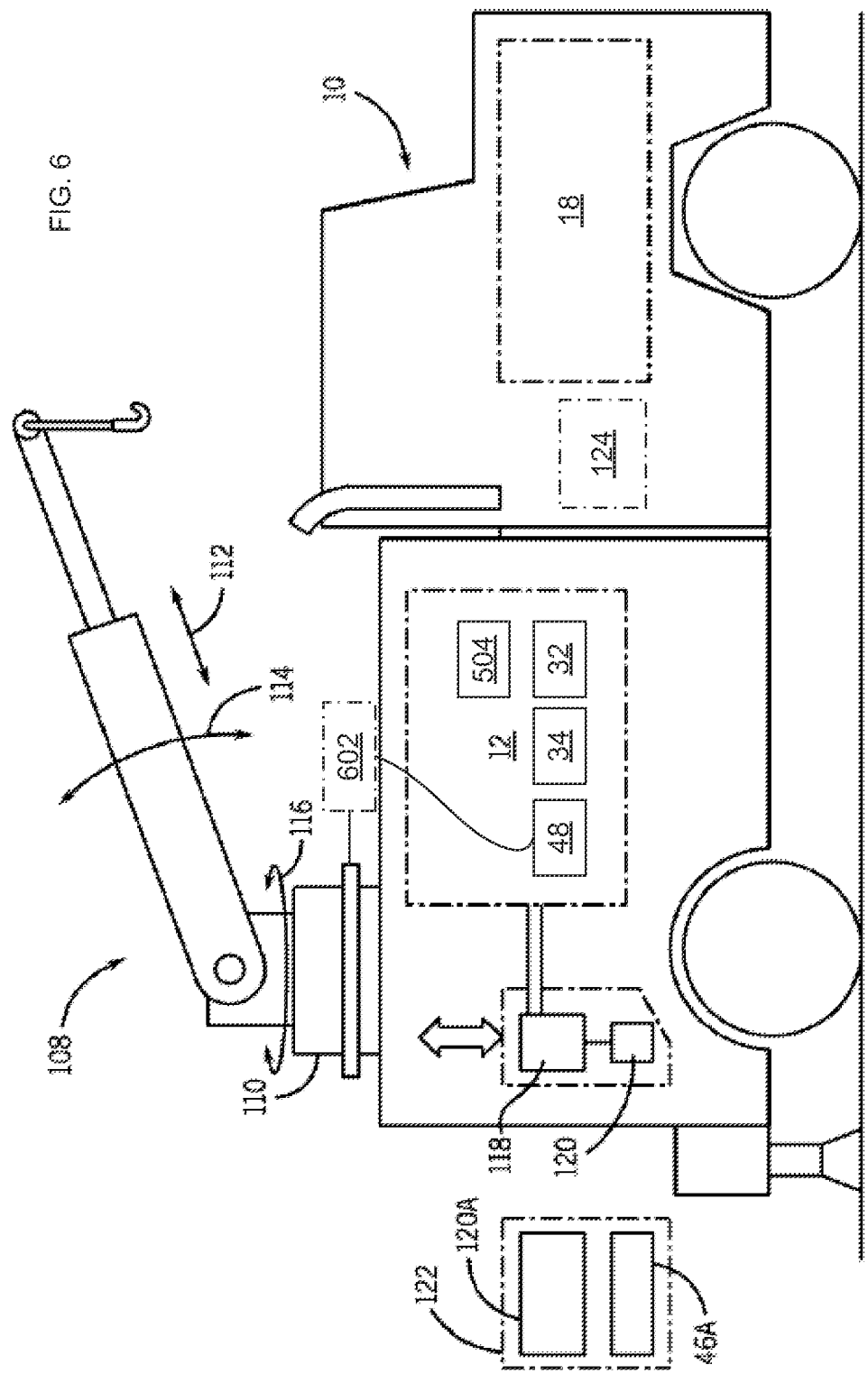
FIG. 6 illustrates a first example configuration of the work truck to provide electrical power to the example crane by connecting an AC motor of the crane to the AC receptacle of the service pack.

FIG. 6 illustrates a first example configuration of the work vehicle 10 to provide electrical power to the example crane 108 by connecting an AC motor 602 of the crane 108 to the generator 34 of the service pack 12. The crane 108 may be hardwired directly to the generator 34 to receive AC electrical power, hardwired to the generator 34 via one or more intermediate components (e.g., transformers, boost and/or buck circuits, etc.), and/or connected to the generator 34 via the AC receptacle 48. In the example of FIG. 6, the service pack 12 alone can be used to power the crane 108, enabling the engine 18 of the work vehicle 10 to be turned off while still permitting operation of the crane 108, thereby achieving the benefits discussed above with respect to FIG. 5.

Figure 7:
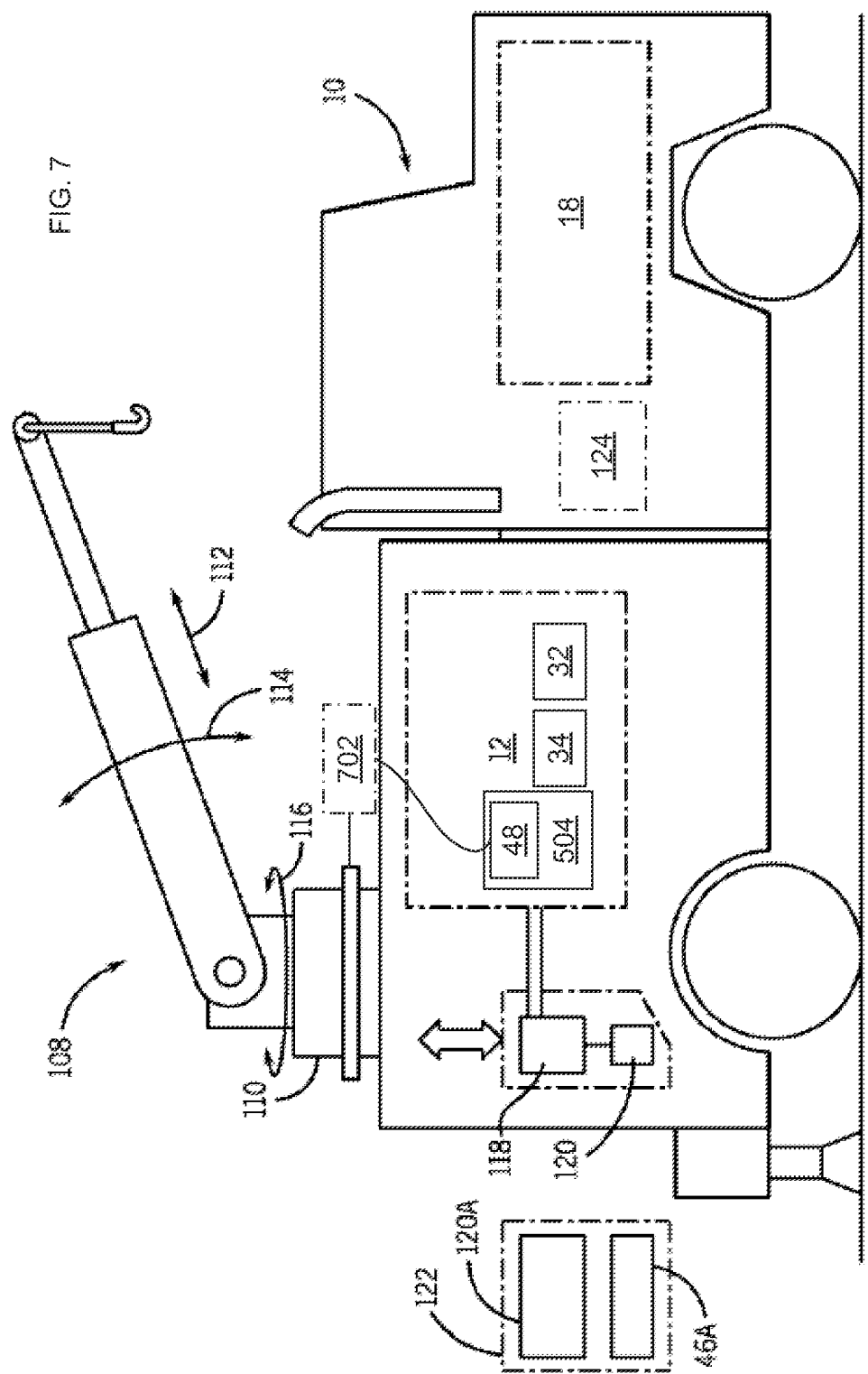
FIG. 7 illustrates another example configuration of the work truck and the service pack to provide electrical power to the example crane by converting the AC power generated by the service pack to DC power using a AC-to-DC power converter in the crane.

FIG. 7 illustrates another example configuration of the work vehicle 10 and the service pack 12 to provide electrical power to the example crane 108 by converting the AC power generated by the service pack 12 to DC power using a AC-to-DC power converter 702 in the crane 108. Like the example AC motor 602 of FIG. 6, the AC-to-DC power converter 702 may be connected to the AC receptacle 48 of the service pack 12. Thus, the service pack 12 alone can be used to power the crane 108 via the AC-to-DC power converter 702, enabling the engine 18 of the work vehicle 10 to be turned off while still permitting operation of the crane 108.

Figure 8:
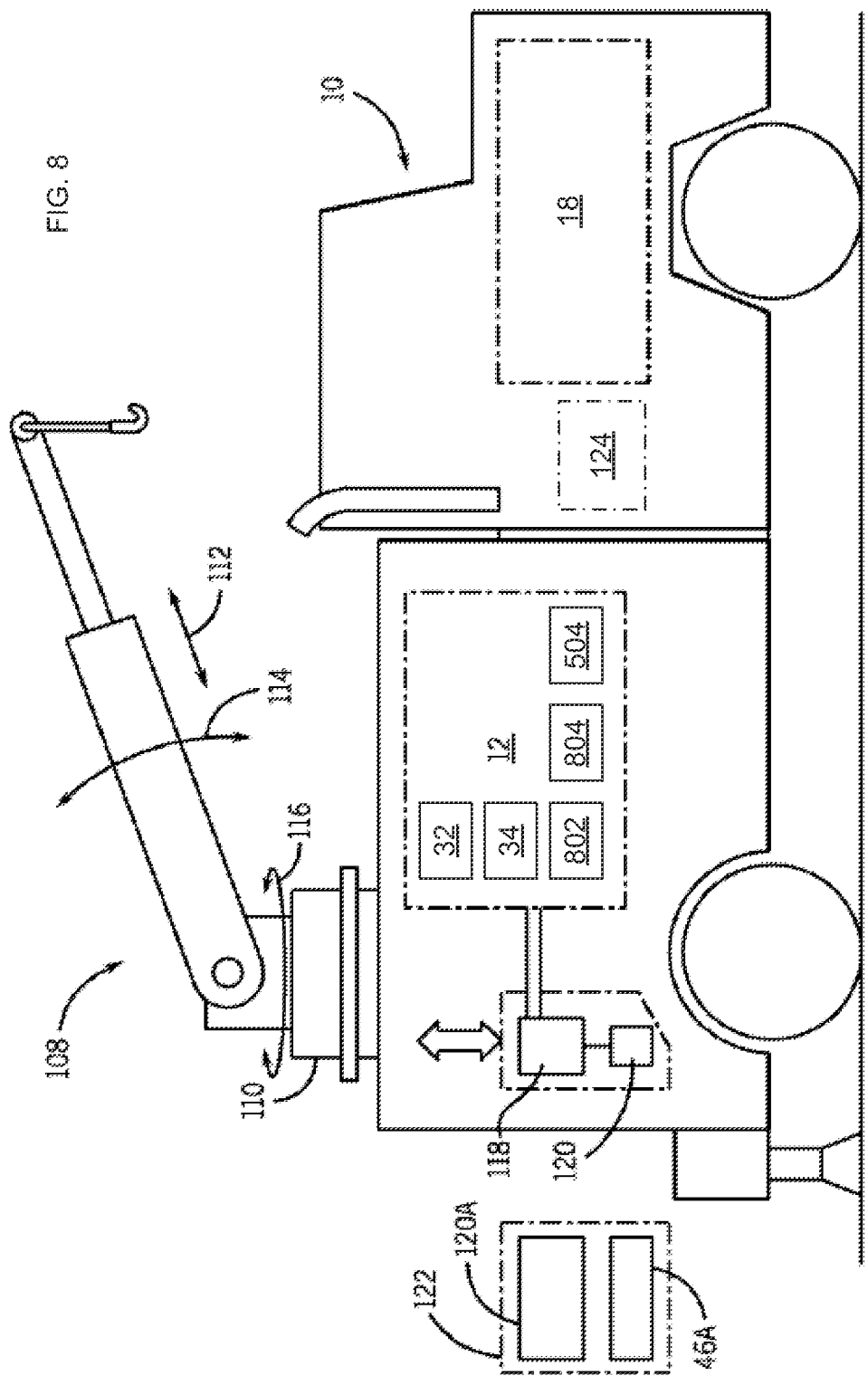
FIG. 8 illustrates another example configuration of the work truck, the service pack, and the crane to use one or more batteries and integrated battery charge circuit to provide power from the service pack to the crane.

FIG. 8 illustrates another example configuration of the work vehicle 10, the service pack 12, and the crane 108 to use one or more batteries 802 and integrated battery charge circuit 804 to provide power from the service pack 12 to the crane 108. The crane 108 is connected to the one or more batteries 802 to receive stored power to operate the crane 108. The one or more batteries 802 are in turn connected to the battery charge circuit 804. The battery charge circuit 804 provides battery charging current and/or current to operate the crane 108.

The one or more batteries 802 may be isolated from or connected to the electrical system (e.g., the batteries and/or alternator) of the work vehicle 10, may be coupled to provide unidirectional current (e.g., the batteries 802 to the engine 18 or the engine to the batteries 802, as needed to support a load on the receiving unit), and/or may be coupled to provide bidirectional current between the batteries 802 and the engine 18 (e.g., to provide charge from the batteries 802 to the battery of the work vehicle 10 and/or from the battery of the work vehicle 10 to the batteries 802).

In some other examples, the batteries 802 may be replaced and/or supplemented with other energy storage devices, such as one or more capacitors.

Figure 9:
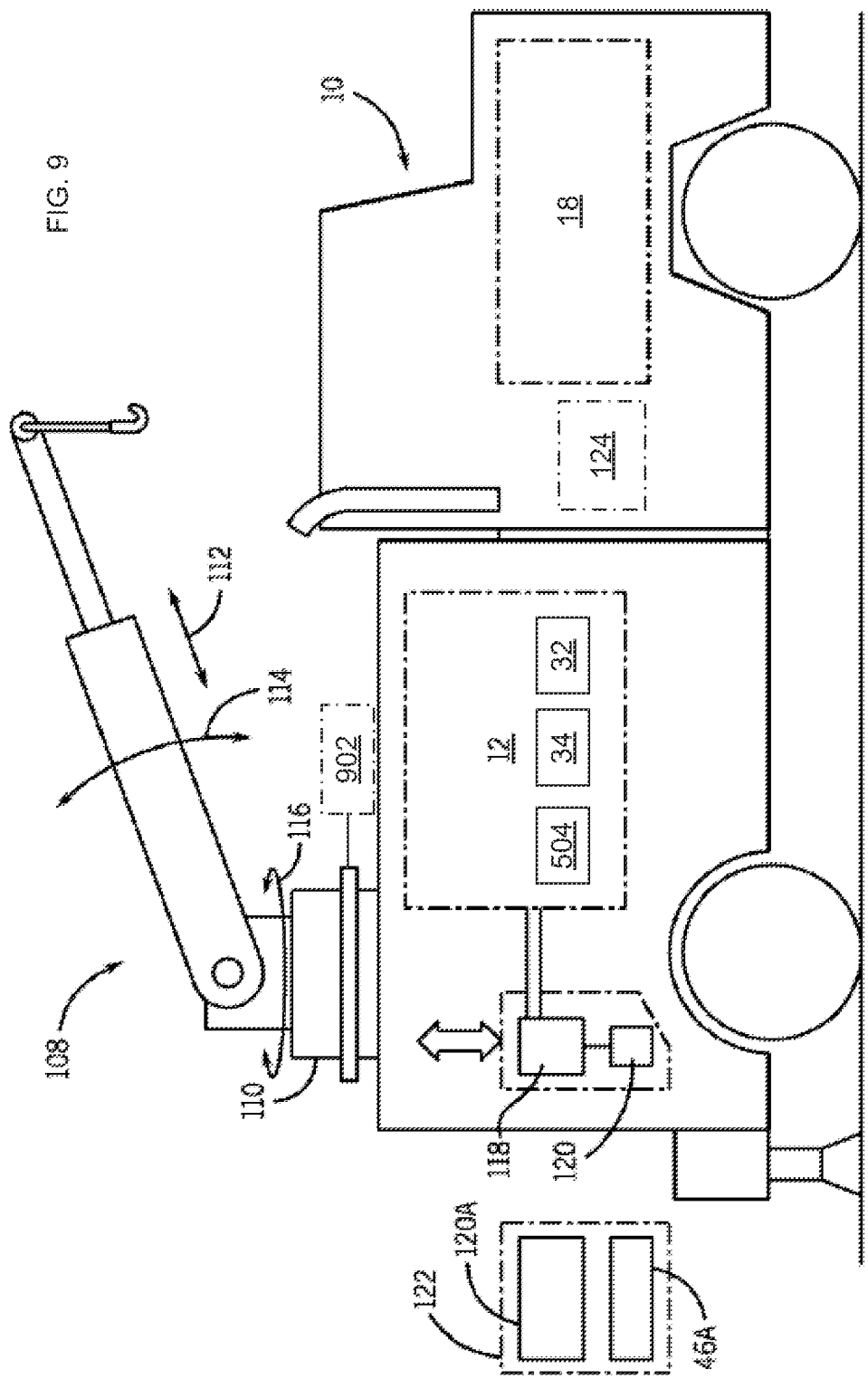
FIG. 9 illustrates another example configuration of the work truck, the service pack, and the crane to use an air compressor powered by the service pack to power the crane.

FIG. 9 illustrates another example configuration of the work vehicle 10, the service pack 12, and the crane 108 to use an air compressor 902 powered by the service pack 12 to power the crane 108. The example air compressor 902 is configured to provide sufficient pressure to operate the hydraulic system of the crane 108. The air compressor 902 may be an electrically powered unit separate from the service pack 12. Alternatively, the air compressor 902 may be part of the service pack 12.

Figure 10:
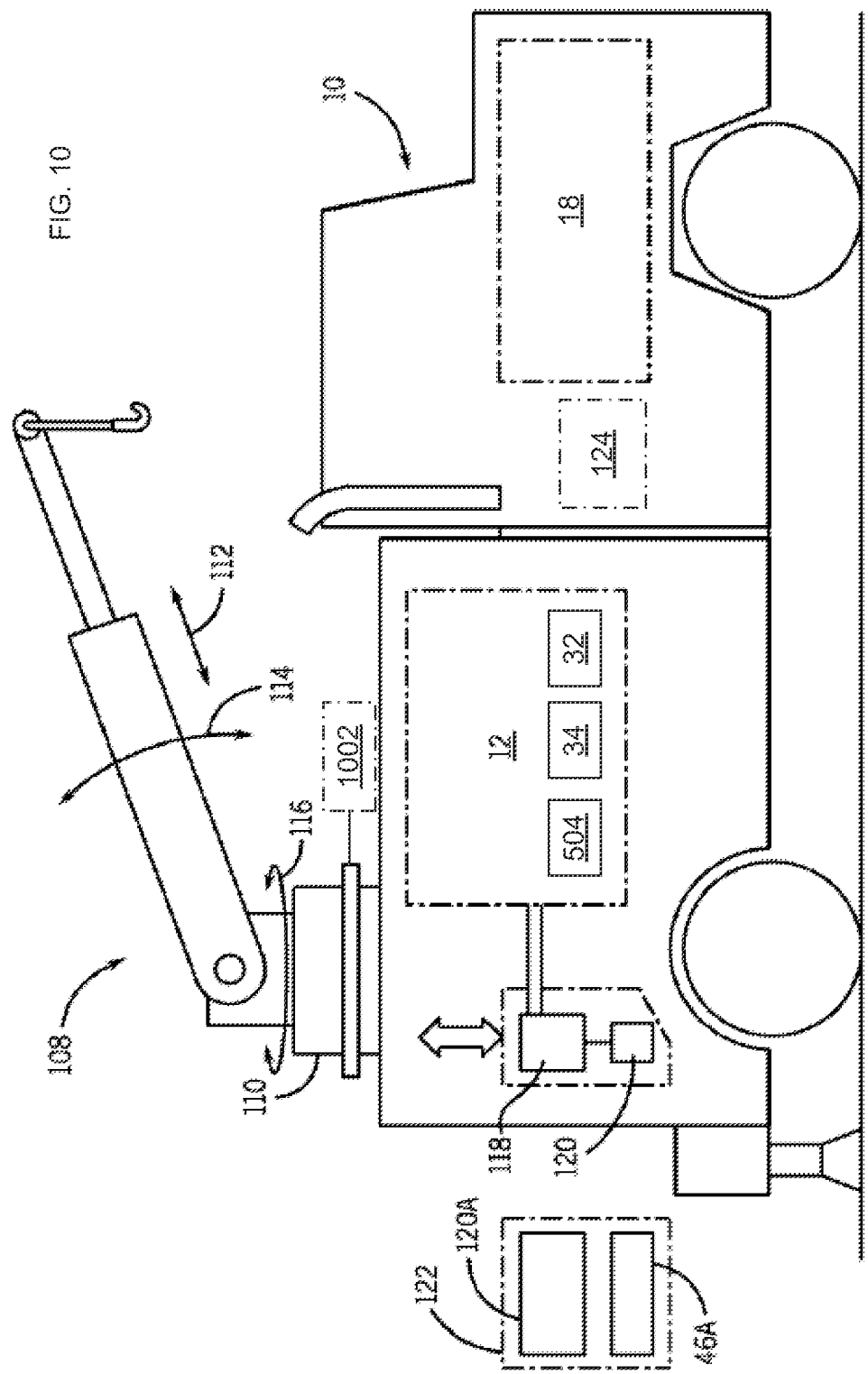
FIG. 10 illustrates another example configuration of the work truck, the service pack, and the crane to use a portable welding power supply powered by the service pack to provide DX power to the crane.

FIG. 10 illustrates another example configuration of the work vehicle 10, the service pack 12, and the crane 108 to use a portable welding power supply 1002 powered by the service pack 12 to provide DC power to the crane 108. For example, the portable welding power supply 1002 may be a current-controlled or voltage-controlled welding power supply connected to the AC receptacle 48. An example portable welding power supply is the Maxstar 150 sold by Miller Electric Manufacturing Company.

For example, the portable welding power supply 1002 and/or the crane 108 may include circuitry (e.g., impedance-matching circuitry) to enable the portable welding power supply 1002 to provide the current necessary to operate the crane 108. In some examples, the portable welding power supply 1002 includes a battery charge output separate from the welding output and/or an output that is selectable between battery charging and welding, where the battery charge output is used to provide the power to the crane 108 and/or to a battery in the service pack 12 that provides the power to the crane 108. In some examples, the low voltage battery charge output uses at least some of the power conditioning circuitry used for generating a welding output, and further controls the output current based on one or more battery charging modes.

FIG. 11 illustrates another example configuration of the work vehicle 10, the service pack 12, and the crane 108 to use a battery charge circuit 1102 (e.g., the power conversion circuitry 504) of the service pack 12 to charge one or more energy storage device(s) 1104 that provide power to the crane 108. For example, the energy storage device(s) may be installed in the service pack 12, attached to the work vehicle 10 independently of the service pack 12 and/or independently of the work vehicle 10. For example, the energy storage device(s) 1104 may be solely or primarily responsible for providing power to the crane 1104, and coupled to the battery charge circuit 1102 for recharging. The energy storage device(s) 1104 may include a cranking battery installed in the work vehicle 10, an auxiliary battery coupled to the crane 108, one or more supercapacitor(s), a flywheel, and/or any other type of energy storage device. The battery charge circuit 1102 converts power output by the generator 34 to DC power based on power appropriate for battery charging. Instead of using the engine 18 to charge the work truck battery and/or provide power to the crane 108, the battery charge circuit 1102 can be powered by the service engine 32, which permits the crane 108 to be operated when the engine 18 is off. In some examples, the engine 18 is provided with automatic stopping to reduce the running time of the engine 18 and/or automatic starting to provide additional charging when, for example, the charge on the battery decreases below a threshold level.

The battery charge circuit 1102 changes between operating modes to charge the batteries of the work vehicle 10, such as trickle charging mode, rapid charging mode, a normal charging mode. When the crane 108 is operational, the battery charge circuit 1102 may operate in the rapid charging (e.g., high current) mode, or a similar mode configured to provide high DC current to the crane 108.

In the example of FIG. 11, the battery charge circuit 1102 may obtain power from a low voltage (e.g., approximately 12 VDC), high current winding of the generator 34. In some other examples, the battery charge circuit 1102 obtains power from the high voltage AC circuitry in the service pack 12 that provides power to the AC receptacle(s) 48.

FIG. 12 illustrates another example configuration of the work vehicle 10, the service pack 12, and the crane 108 to use an alternator 1202 of the service engine 32 to power the crane 108. The alternator 1202 provides electrical power to a battery 1204 of the service engine 32. In the example of FIG. 12, the alternator 1202 and/or the battery 1204, in addition to providing electrical power to the service engine 32, may be used to power the crane 108 directly, via providing power to the electrical system (e.g., the battery) of the work vehicle 10, and/or by providing power to the battery 1204 of the service pack 12 which is then used to power the crane 108.

In contrast to the example of using the battery charge circuit 1102 of FIG. 11, which may require manual selection as an output of the service pack 12 to provide power, the alternator 1202 is in continuous use while the service engine 32 is on and can provide power at any time, whether the service engine 32 is operating at rated speed or operating at idle speed.

It should be noted that certain applications may call for electrical power from the service pack and compressed air only, without a need for hydraulic service. On the contrary, other applications may call for electrical power and hydraulic service, without the need for compressed air. Applications of the latter type may include manlifts, bucket trucks and the like. In such cases, disclosed examples may include integration of the service pack support systems with those of the main vehicle power plant, but without either the air compressor or the hydraulic pump, and the ancillary components used to support those elements, such as hoses, conduits and so forth.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set $\{(x), (y), (x, y)\}$. In other words. "x and/or y" means "one or both of x and y". As another example, "x, y, and/or z" means any element of the seven-element set $\{(x), (y), (z), (x, y), (x, z), (y, z), (x, y, z)\}$. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

While the present method and/or system has been described with reference to certain implementations, it will be understood by those skilled in the art that various changes may be made and equivalents may be substituted without departing from the scope of the present disclosure. In addition, many modifications may be made to adapt a particular situation or material to the teachings of the present disclosure without departing from its scope. For example, systems, blocks, and/or other components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed is:

1. An auxiliary power system for a vehicle, comprising:
 an engine;
 a generator configured to convert mechanical energy from the engine to electrical energy; and a battery charging circuit configured to:
   receive the electrical energy from the generator;
   generate battery charging output power from the electrical energy from the generator in a plurality of battery charging modes, wherein the battery charging circuit is coupled to a battery and configured to charge the battery, and coupled to a crane to power the crane;
   generate the battery charging output power to charge the battery according to a first, second, or third battery charging mode of the plurality of modes; and
   generate the battery charging output power to power the crane according to the first battery charging mode.

2. The auxiliary power system as defined in claim 1, further comprising a portable welding power supply having power conversion circuitry configured to generate a welding output power and the battery charging output power.

3. The auxiliary power system as defined in claim 2, wherein the power conversion circuitry is configured to charge the battery via the battery charging output power.

4. The auxiliary power system as defined in claim 1, wherein the battery is a cranking battery installed in the vehicle.

5. The auxiliary power system as defined in claim 2, wherein the power conversion circuitry comprises an AC-to-DC converter configured to convert AC power from the generator to DC power.

6. The auxiliary power system as defined in claim 5, wherein the AC-to-DC converter comprises at least one of a switched mode power supply or welding-type power conversion circuitry.

7. The auxiliary power system as defined in claim 5, wherein the power conversion circuitry is a welding-type power supply that is detachable from the generator.

8. The auxiliary power system as defined in claim 2, further comprising a remote control interface configured to control at least one aspect of the power conversion circuitry.

9. The auxiliary power system as defined in claim 8, wherein the remote control interface is configured to control operation of the crane receiving the electrical power from the power conversion circuitry.

10. The auxiliary power system as defined in claim 1, wherein the power conversion circuitry comprises an alternating current (AC) receptacle, and the power conversion circuitry configured to provide the electrical power to the crane via an electrical cord when the electrical cord is plugged into the AC receptacle.

11. The auxiliary power system as defined in claim 1, wherein the crane and the auxiliary power system are installed on the vehicle, and the power conversion circuitry is configured to provide the electrical power to operate the crane while an engine of the vehicle is off.

12. The auxiliary power system as defined in claim 1, further comprising an alternator configured to receive the mechanical energy from the engine and configured to provide at least a first portion of the electrical power to the crane via the power conversion circuitry.

13. The auxiliary power system as defined in claim 12, wherein a second portion of the electrical power is provided to the crane from the battery.

14. The auxiliary power system as defined in claim 1, wherein the crane is an electric crane.

15. The auxiliary power system as defined in claim 1, wherein the battery charging output power for the first, second, and third modes of the plurality of modes corresponds to a first, second, and third current amount.

16. An auxiliary power system for a vehicle, comprising:
a battery charging circuit configured to:
   receive electrical energy from a generator;
   generate battery charging output power from the electrical energy from the generator in a plurality of battery charging modes, wherein the battery charging circuit is coupled to a battery and configured to charge the battery, and coupled to a crane to power the crane;
   generate the battery charging output power to charge the battery according to a first, second, or third battery charging mode of the plurality of battery charging modes; and
   generate the battery charging output power to power the crane according to the first battery charging mode wherein the output power for the first, second, and third battery charging modes of the plurality of battery charging modes corresponds to a first, second, and third current amount.

17. The auxiliary power system as defined in claim 16, wherein the first mode corresponds to a rapid charging mode.

18. The auxiliary power system as defined in claim 16, wherein the third mode corresponds to a trickle charging mode.

19. The auxiliary power system as defined in claim 16, wherein the first mode corresponds to an amount current greater than the second or third mode.

20. The auxiliary power system as defined in claim 16, wherein the crane is an electric over hydraulic crane configured to receive the battery charging output power to operate one or more hydraulic pumps of the crane to lift a load.

* * * * *